Aug. 30, 1932.   A. VAN GASTEL   1,873,987
PROTECTIVE SYSTEM
Filed July 29, 1930
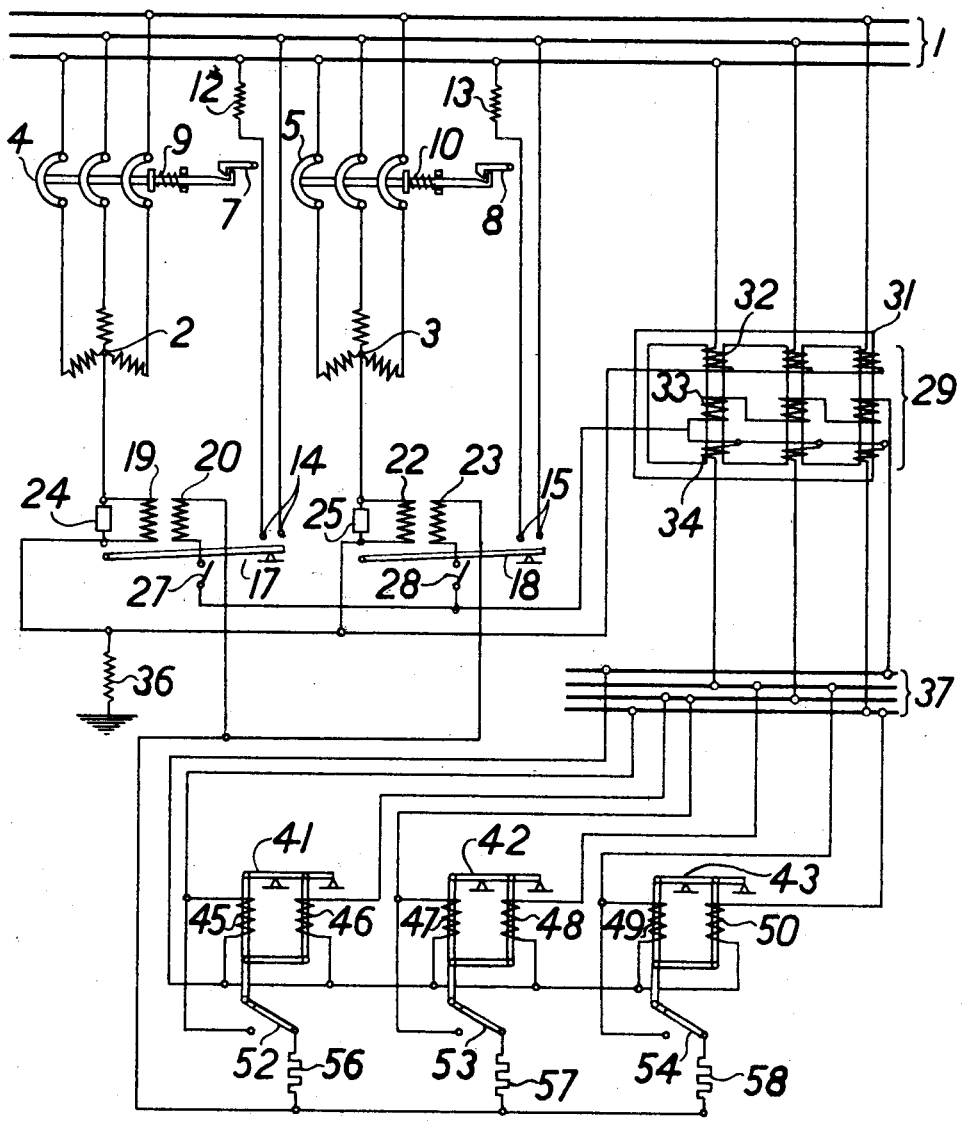
Inventor
Albertus Van Gastel
By
Attorney

UNITED STATES PATENT OFFICE

ALBERTUS VAN GASTEL, OF WETTINGEN, SWITZERLAND, ASSIGNOR TO AKTIENGESELL-
SCHAFT BROWN BOVERI & CIE, OF BADEN, SWITZERLAND, A JOINT-STOCK COM-
PANY OF SWITZERLAND

PROTECTIVE SYSTEM

Application filed July 29, 1930, Serial No. 471,534, and in Germany July 29, 1929.

The invention relates to improvements in electric protective systems and, particularly, to systems for protecting polyphase windings having a neutral point, when such windings are connected in parallel to a common supply, from damage and disturbance of the field symmetry of the winding.

When polyphase electrical windings such as alternating current generators or transformers, having commonly connected neutral points are to be protected from short-circuits, reactances or protective relays were connected between the common connection point of the neutral points of the winding and the supply line. Such reactances were usually connected to the same network supplying the generators and operated relays for opening the switches in the supply line to such generators. When disturbances of any nature occur, if a plurality of polyphase windings are supplied from a common network, a disturbance in one of the windings causes an equalizing current to flow through all of the reactances and relays thereby operating all of the relays which precludes all possibility of selective action. A selective relay operation can take place only if each of the windings and if the corresponding reactance are insulated from the other windings and the other reactances. To obtain the proper selective protection the use of single phase auxiliary transformers, connected to the supply system in such number as to correspond to the number of phases of the network, has been proposed particularly in an application for United States Letters Patent by Julius Jonas, S. N. 421677, which application for Letters Patent has been assigned to Brown Boveri & Company the assignee of the present application. In the above application one end of each of the primary windings of the transformer is connected to the common neutral point of the windings to be protected, while the other ends of the primary windings of the transformer are connected to different phases of the supply network. The secondary windings of the transformer are connected in series and in opposition to each other so that, when the phase voltages are equal in the primary winding, the voltage in the entire series of the secondary windings is equal to zero. The neutral point of the primary windings of such auxiliary transformers is connected with the neutral point of all the polyphase windings to be protected which are connected in parallel to the supply network and the coils of relays having a current and a voltage coil are connected between the neutral points of each winding and the common connection point thereof. The voltage coils of the several relays are supplied from the secondary winding of the auxiliary transformer so that each of the relays is operative in dependence on the direction of current flow in the system. It is however necessary to make the third harmonic occurring at the neutral point connection inoperative to actuate the relays for which purpose tuned resonant circuits bridging the secondary terminals of the auxiliary transformers are necessary in the above-mentioned application.

The third harmonic may be made ineffective with respect to operation of the relays by providing the auxiliary single phase transformers with an additional star connected secondary winding, the neutral point of which is connected to one terminal of the series connected secondary winding while the free ends of the auxiliary star connected windings are connected to a bus-bar system from which a number of relays, corresponding to the number of phases of the supply network, are supplied. The terminals of the relays are connected with the other terminals of the series connected secondary winding so that the relays are connected to the voltage.

It is, therefore, among the objects of the present invention to provide an electrical protective system for parallel connected polyphase windings having a common neutral point, which system will have a selective action due to the operation of relays in dependence on both the direction and strength of the fault current operating the same.

Another object of the present invention is to provide an electric protective system for parallel connected polyphase windings having a neutral point in which a number of single phase transformers mounted on a single core are so connected with a plurality of relays as to permit selective operation of the relays controlling the switches of the windings.

Another object of the invention is to provide a protective system for parallel connected polyphase windings in which a plurality of auxiliary transformers are provided with differently connected secondary windings supplying the voltage to a plurality of relays which control the operation of the switches connecting the windings to a supply system.

Objects and advantages, other than those above set forth, will be apparent from the following description when read in connection with the accompanying drawing which diagrammatically illustrates one embodiment of the present invention.

Referring more particularly to the drawing by characters of reference, the reference numeral 1 designates a polyphase electrical conductor which may supply or may be supplied from polyphase apparatus such as transformers or generators indicated at 2 and 3. The windings 2 and 3 each having a neutral point, are connected in parallel to the line 1 through circuit breakers 4 and 5 which are normally retained in the closed position by latches 7 and 8 and which may be opened by compression springs 9 and 10 when coils 12 and 13 are energized to attract and release the latches. The neutral points of the windings 2 and 3 are inter-connected and form one portion of the control circuits to be described hereinafter.

The circuit breaker releasing coils 12 and 13 are connected with and supplied from the supply line 1 upon bridging of pairs of contacts 14 and 15 by armatures 17 and 18 operable by coils 19 and 20, and 22 and 23 of wattmetric relays. The coils 19, 22 are current coils connected in parallel with the shunts 24, 25 and the coils 20, 23 are voltage coils controlled by switches 27 and 28, which are actuated to closed position responsive to flow of current in the current coils 19, 22, respectively, of the wattmetric relays.

An auxiliary transformer 29 including a multilegged core 31, a plurality of star connected primary windings 32 equal in number to the number of phases of the supply line 1, a number of secondary windings 33 connected in series and a number of secondary windings 34 connected in star, is connected with the supply line 1. One end of the series secondary winding 33 and the neutral point of the star secondary winding 34 are connected through the switches 27 and 28 with the coils 20 and 23. The free end of the series secondary winding 33 is connected with the common connection point of the windings of a series of phase relays 41, 42, 43, which are equal in number to the phases of the supply line.

Each portion of the star connected secondary winding 34 is connected with one portion of an auxiliary bus-bar 37 from which connections lead to the various coil windings of the phase relays 41, 42, 43. Each of the phase relays includes cores 41, 42 and 43 operable by coils 45, 46; 47, 48; 49, 50 respectively to cause movement of an armature 52, 53, 54 to complete a circuit to the voltage coils 20, 23, through resistance 56, 57, 58. The resistances prevent short-circuiting of the phases of the auxiliary transformer 29 when any two or more of the phase relays operate simultaneously.

In normal operation, as long as the phase voltages in the primary windings 32 of the transformer 29 are equal in value, the voltage in the secondary series winding 33 is zero. The potential of the neutral point connection of the windings 2 and 3 is then the neutral potential of the supply line 1. The neutral point of the primary windings of the single phase transformers being connected with the neutral point connection for the windings 2 and 3, such point is operable at the neutral potential of the supply line 1 and the voltages of the separate primary windings of the transformer are therefore the phase voltages of a symmetrical voltage system and are accordingly of equal value. If the several primary windings of the transformer have the same number of ampere turns, the secondary windings will also have the same voltage. Such voltages have such phase angles with respect to each other, in a symmetrical voltage system, that the resulting voltage of the series secondary winding 33 is equal to zero. As long as neither of the windings 2, 3 are short-circuited, the switches 52, 53, 54 remain open but as soon as a fault appears in one of the windings the voltage of the coil operating as a holding coil becomes less than that of the other coil and the switches are closed thereby connecting the corresponding voltage coils 20 or 23 to the voltage of the phase which contains the fault. The armature 17 or 18 is then raised to complete the circuits of the circuit breaker releasing coil 12 or 13 to disconnect the affected winding of 2 or 3. The above result is due to the fact that the occurrence of a short-circuit in one of the phases causes the voltage in the short-circuited phase to drop and the voltage neutral point of that phase is displaced thereby causing a circulating current to flow from the neutral point of the damaged winding to the neutral point of the undamaged windings. Such circulating current causes displacement of the neutral point of the sound windings and also causes displacement of the neutral point of the auxiliary transformer primary windings. The neutral point displacement of the transformer primary is accelerated by the fact that the magnetic circuit of the transformer is linked. The voltages of the primaries are accordingly then no longer equal and a voltage is produced in the secondary winding, the phase angle of which is determined by the direction of the circulating current and is therefore dependent on which of the winding phases of the affected apparatus contains the short circuit. The circulating current will accordingly flow through the current coils 19 and 22 in different directions.

The above system thus permits starting of the relays only when a circulating current flows over the neutral points of the windings 2 or 3 and when the voltage symmetry of the auxiliary transformer 29 is disturbed. Inequalities in the phase voltage due to unsymmetric loading in normal operation do not operate the phase relays because in such cases there is no difference between the angles of the several phase voltages. Over waves or harmonics are likewise without influence on the phase relays.

Although but one embodiment of the present invention has been illustrated and described, it will be apparent to those skilled in the art that various changes and modifications may be made therein without departing from the spirit of the invention or from the scope of the appended claims.

The invention claimed is:

1. In a system for selectively protecting polyphase electrical windings from the results of continuing short-circuits, a polyphase supply line, polyphase electrical windings having a neutral point, said windings being connected in parallel with said supply line, circuit breakers interposed between said line and said windings, a transformer structure connected with said supply line and said windings, a plurality of relays connected with said windings and said transformer and energized therefrom to cause opening of said circuit breakers, and a plurality of relays connecting said transformer with said first-mentioned relays to cause actuation thereof upon occurrence of a disturbance in the field symmetry of said windings.

2. In a system for selectively protecting polyphase electrical windings from the results of continuing short-circuits, a polyphase supply line, polyphase electrical windings having a neutral point, said windings being connected in parallel with said supply line, circuit breakers interposed between said line and said windings, a transformer structure connected with said supply line, said transformer structure having a primary winding, and a plurality of secondary windings, a plurality of relays having a current coil and a voltage coil, the current coils being connected with the neutral point of said windings and the voltage coils being connected with a secondary winding of said transformer, said relays being operable to cause opening of said circuit breakers, and a plurality of relays connecting said transformer and said first-mentioned relays to cause actuation thereof upon occurrence of a disturbance in the field symmetry of said windings.

3. In a supply system for selectively protecting polyphase electrical windings from the results of continuing short-circuits, a polyphase supply line, polyphase electrical windings having a neutral point, said windings being connected in parallel with said supply line, circuit breakers interposed between said line and said windings, a transformer structure connected with said supply line, said transformer structure having a primary winding and a plurality of secondary windings, one of the secondary windings being connected in series and the other of the secondary windings being connected in star, a plurality of relays each having a current coil and a voltage coil, the current coils being connected with the neutral point of said windings and the voltage coils being connected with the series connected secondary winding of said transformer, said relays being operable to cause opening of said circuit breakers, and a plurality of relays connecting said transformer and said first-mentioned relays to cause actuation thereof upon occurrence of a disturbance in the field symmetry of said windings.

4. In a system for selectively protecting polyphase electrical windings from the results of continuing short-circuits, a polyphase supply line, polyphase electrical windings having a neutral point, said windings being connected in parallel with said supply line, circuit breakers interposed between said line and said windings, an auxiliary bus-bar system, a transformer structure connected with said supply line, said transformer structure having a primary winding and a plurality of secondary windings, one of the secondary windings being connected in series and the other of the secondary windings being connected in star, the neutral point of the star-connected secondary winding being connected with one terminal of the series connected winding, the free terminal of the series-connected secondary winding being connected with said auxiliary bus-bar system, a plurality of relays each having a current coil and a voltage coil, the current coils being connected with the neutral point of said windings and the voltage coils being connected with the series-connected secondary windings of said transformer, said relays being operable to cause opening of said circuit breakers, and a plurality of relays connecting said auxiliary bus-bar system and said first-mentioned relays to cause actuation thereof upon occurrence of a disturbance in the field symmetry of said windings.

5. In a system for selectively protecting polyphase electrical windings from the results of fault connections, a polyphase line, a plurality of polyphase windings having a common neutral point, said windings being connected in parallel with said line, a circuit breaker interposed between each of said windings and said line operative to effect disconnection of its associated winding from said line upon the occurrence of a fault connection in said winding, a transformer having a primary winding divided into a plurality of sections equal to and connected with the respective phases of said line, said transformer having a plurality of secondary windings each divided into sections equal in number to the phases of said line, a wattmetric relay individual to each of said windings having its current coil connected in circuit with the neutral point of its associated winding and operative upon the occurrence of a fault connection in its associated winding, a plurality of relays equal in number to and connected with a corresponding section of one of said secondary windings selectively operative upon the occurrence of a fault connection in the first said windings to effect connection of the voltage coils of said wattmetric relays with another of said secondary windings to cause operative actuation of the said wattmetric relays upon the occurrence of a fault connection in the associated winding to effect said disconnection actuation of the associated one of said circuit breakers.

In testimony whereof I have hereunto subscribed my name this 15th day of July A. D. 1930.

A. van GASTEL.